US006453102B1

(12) United States Patent
Dong et al.

(10) Patent No.: US 6,453,102 B1
(45) Date of Patent: Sep. 17, 2002

(54) DISPERSION COMPENSATING MODULE AND MODE CONVERTER, COUPLER AND DISPERSION COMPENSATING OPTICAL WAVEGUIDE THEREIN

(75) Inventors: Liang Dong; Gang Qi, both of Painted Post; David L. Weidman, Horseheads, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/620,477

(22) Filed: Jul. 20, 2000

Related U.S. Application Data

(60) Provisional application No. 60/180,824, filed on Feb. 7, 2000.

(51) Int. Cl.$^7$ .............................. G02B 6/16; G02B 6/22
(52) U.S. Cl. ..................... 385/123; 385/124; 385/127
(58) Field of Search .............................. 385/126–128, 385/123, 124

(56) References Cited

U.S. PATENT DOCUMENTS

| 4,974,931 A | 12/1990 | Poole | 350/96.29 |
| 5,185,827 A | 2/1993 | Poole | 385/28 |
| 5,261,016 A | 11/1993 | Poole | 385/28 |
| 5,295,211 A | 3/1994 | Weidman | 385/43 |
| 5,311,346 A | 5/1994 | Haas et al. | 359/156 |

(List continued on next page.)

FOREIGN PATENT DOCUMENTS

| EP | 0 598 554 | 5/1994 |
| EP | 0 851 245 A2 | 12/1997 |

(List continued on next page.)

OTHER PUBLICATIONS

Poole et al., Optical Fiber–Based Dispersion Compensation Using Higher Order Modes Near Cutoff, Journal of Lightwave Technology, vol. 12, No. 10, Oct., 1994, pp. 1746–1758.

(List continued on next page.)

*Primary Examiner*—Hemang Sanghavi
*Assistant Examiner*—Omar Rojas, Jr.
(74) *Attorney, Agent, or Firm*—Randall S. Wayland

(57) ABSTRACT

A dispersion compensating module, mode converter, coupler and dispersion compensated optical fiber therein. The dispersion compensating fiber has a plurality of core segments, the refractive index profile being selected to exhibit properties such that an $LP_{02}$ mode at 1550 nm may be propagated a distance (generally 0.5–3.0 km), upon conversion to $LP_{02}$, to compensate for dispersion of a length of transmission waveguide preferably greater than 25 km propagating in an $LP_{01}$ mode. In another embodiment, the dispersion compensating module has a mode converter having a reflective fiber grating for converting a first to a second mode interconnected to a dispersion compensated fiber propagating in the second mode. The mode converter has a coupler adapted to operatively couple light propagating in a first mode from a first fiber into a second, and a reflective fiber grating operatively coupled to the second fiber; the grating being capable of converting light from the first into the second mode. According to another embodiment, an optical fiber coupler is provided having a first fiber with a first propagation constant in a first mode, and a second fiber within the coupler having a second propagation constant, the second fiber including a necked-down portion which is formed prior to fusion of the fibers, the necked-down portion being formed such that the local propagation constant of the second fiber substantially matches the first propagation constant thereby enhancing first mode coupling.

37 Claims, 8 Drawing Sheets

U.S. PATENT DOCUMENTS

| | | | |
|---|---|---|---|
| 5,371,815 A | 12/1994 | Poole | 385/28 |
| 5,405,474 A | 4/1995 | Berkey et al. | 156/250 |
| 5,411,566 A | 5/1995 | Poole et al. | 65/402 |
| 5,483,612 A | 1/1996 | Gallagher et al. | 385/127 |
| 5,553,185 A | 9/1996 | Antos et al. | 385/127 |
| 5,581,647 A | 12/1996 | Onishi et al. | 385/123 |
| 5,671,309 A | 9/1997 | Abe et al. | 385/43 |
| 5,802,234 A | 9/1998 | Vengsarkar et al. | 385/123 |
| 5,894,537 A | 4/1999 | Berkey et al. | 385/123 |
| 5,982,963 A | 11/1999 | Feng et al. | 385/37 |
| 5,999,679 A | 12/1999 | Antos et al. | 385/127 |
| 6,009,221 A | 12/1999 | Tsuda | 385/123 |
| 2002/0003926 A1 | 1/2002 | Enomoto et al. | 385/37 |

FOREIGN PATENT DOCUMENTS

| | | | | |
|---|---|---|---|---|
| FR | 1 116 968 | 7/2001 | | G02B/6/16 |
| GB | 0 668 520 | 8/1995 | | G02B/6/16 |
| GB | 0 713 110 | 5/1996 | | G02B/6/293 |
| GB | 0 774 676 | 5/1997 | | G02B/6/16 |
| GB | 0 866 574 | * 9/1998 | | H04B/10/18 |
| GB | 0 902 307 | 3/1999 | | G02B/6/16 |
| WO | WO 98/48305 | 10/1998 | | G02B/6/287 |
| WO | WO 99/26094 | 5/1999 | | G02B/6/22 |
| WO | WO 99/49340 | 9/1999 | | |
| WO | WO 99/49341 | 9/1999 | | |
| WO | WO 99/49342 | 9/1999 | | |

OTHER PUBLICATIONS

Vengsarkar et al., "Dispersion–compensating single mode fibers: efficient designs for fist–and second–order compensation", Optics Letters, vol. 18, No. 11, Jun. 1, 1993, pp. 924–926.

Poole et al., "Broadband dispersion compensation by using the higher–order spatial mode in a two–mode fiber", Optics Letters, vol. 17, No. 14, Jul. 15, 1992, pp. 985–987.

Vengsarkar et al., "Effect of refractive–index profiles on two–mode optical fiber dispersion compensators", Optics Letters, vol. 17, No. 21, Nov. 1, 1992, pp. 1503–1505.

* cited by examiner

US 6,453,102 B1

DISPERSION COMPENSATING MODULE AND MODE CONVERTER, COUPLER AND DISPERSION COMPENSATING OPTICAL WAVEGUIDE THEREIN

This application claims priority to and the benefit of U.S. Provisional Patent Application No. 60/180,824, filed Feb. 7, 2000.

FIELD OF THE INVENTION

The invention relates to an optical waveguide fiber and optical components. More particularly, the invention relates to a dispersion compensating module and a mode converter, coupler and dispersion compensating optical waveguide fiber useable therewith.

BACKGROUND OF THE INVENTION

Dispersion compensating fibers used in telecommunications systems 10, such as illustrated in FIG. 1, correct for the unwanted effects of dispersion of the transmission fiber 12. Transmission fibers 12 preferably have a large effective area (e.g., >60 $\mu m^2$, and more preferably greater than 70) and propagate light signals in the fundamental mode ($LP_{01}$). An example of a transmission fiber is LEAF® optical fiber manufactured by Corning Incorporated of Corning, N.Y., which is designed to operate primarily at about the 1550 nm operating window. In some systems, compensation takes place within a module 11 having a length of Dispersion Compensating (DC) fiber housed within it. A section 13 of transmission fiber terminates at the module 11 and is coupled with the DC fiber. After being dispersion compensated, the DC fiber is again coupled with the transmission fiber 12 and the signal continues along a continuing portion 14 of the transmission system 10. FIG. 1 illustrates a simple system deployment. It should be understood that typical transmissions systems include other devices such as amplifiers before and after the module, add/drop devices, etc.

One solution described in U.S. Pat. No. 5,185,827 and shown in FIG. 2, compensates for the dispersion of the transmission fiber by providing a dispersive waveguide element which transmits the light signal at a higher-order $LP_{11}$ mode. An optical mode converter is utilized to convert the incoming signal from the fundamental mode carried by the transmission fiber to the higher-order mode $LP_{11}$ mode that is supported and carried by the dispersive waveguide element. Similarly, once the dispersion compensation is achieved, a second optical mode converter converts the light signal back to the fundamental mode ($LP_{01}$). However, transmission in the $LP_{11}$ mode has a problem that the signal may be split into multiple modes due to slight imperfections in the fiber's circular geometry. This has the effect of undesirably distorting the transmitted signal.

Thus, it should be recognized that the properties of the DC fiber used in the dispersion compensating module are vitally important to the performance of the overall optical transmission system.

SUMMARY OF THE INVENTION

According to a first embodiment of the invention, an optical waveguide fiber suitable for use as a dispersion compensating fiber is provided with improved properties such that it may advantageously support light propagation in an $LP_{02}$ mode. Preferably, propagation is supported at a wavelength of about 1550 nm and for a sufficient distance to compensate for dispersion of another fiber, for example an optical transmission fiber.

According to another embodiment of the invention, a Dispersion Compensating (DC) waveguide fiber is provided comprising a plurality of core segments. The refractive index profile of the DC fiber is selected to exhibit properties such that an $LP_{02}$ mode is supported and propagated thereby at a wavelength of about 1550 nm. Upon conversion to the $LP_{02}$ mode, preferably by an all-fiber mode converter according to another embodiment of the invention, the incoming signal is propagated within the DC fiber for an appropriate length (generally about 0.5–3.0 km, depending on the transmission fiber used). The DC fiber is designed to compensate $LP_{02}$ mode for the dispersion effects of the transmission optical waveguide (the primary fiber transmitting in an $LP_{01}$ mode).

Preferably, the transmission waveguide, for which dispersion correction is occurring, has a length greater than 25 km, and more typically on the order of between about 50 km–100 km. The invention described herein advantageously allows for a very short segment of DC fiber to accomplish the dispersion compensation. For example, in one embodiment, less than 1/100$^{th}$ of the length of the transmission fiber may be required for compensation of certain transmission fibers, for example Corning's LEAF® optical fiber.

In accordance with another aspect of the invention, the DC optical waveguide fiber exhibits a kappa value between about 10 nm and about 500 nm; where kappa is the ratio of dispersion in the $LP_{02}$ mode at about 1550 nm divided by the dispersion slope in the $LP_{02}$ mode at about 1550 nm. In accordance with a more preferred embodiment, the kappa value is in the range between about 30 nm and about 70 nm. According to another embodiment, the DC waveguide preferably has an effective area greater than about 30 $\mu m^2$ at about 1550 nm, more preferably greater than about 60 $\mu m^2$, and more preferably yet between about 30 $\mu m$ and 150 $\mu m^2$, and most preferably between about 50 $\mu m^2$ and about 90 $\mu m^2$.

In a preferred embodiment of the invention, the fiber comprises a plurality of, preferably at least three core segments. Preferably, first and third segments of the plurality of segments comprise a dopant such as germanium to raise the index of refraction of the core a sufficient amount with respect to the cladding to achieve the desired Δ%. Alternatively, any other suitable dopants such as phosphorous may be employed. Moreover, fluorine doping may be employed to lower the refractive index of a second core region and/or the clad region as compared to the core.

The geometry of the refractive index profile of the DC fiber is selected accordingly to enable transmission of the $LP_{02}$ mode over substantial distances (e.g., >0.5 km). For example, the structure, i.e., the radius of the various segments, their width dimensions, and their Δ% values are selected in accordance with the invention as described in the several examples provided herein.

In accordance with one preferred embodiment, the waveguide comprises a structure with:
  (a) a first core segment having an outer radius in the range between about 3 $\mu m$ and 8 $\mu m$ and a Δ% peak in the range between about 1.0% and 2.5%,
  (b) a second core segment having an outer radius in the range between about 7 $\mu m$ and 13 $\mu m$ and a Δ% peak in the range between about 0.3% and −0.5%, and
  (c) a third core segment having an outer radius between about 10 $\mu m$ and 20 $\mu m$ and a Δ% peak in the range between about 0.2% and 1.0%.

Other embodiments and more preferred values of radii, Δ% or combinations thereof are described more fully in the specification and appended claims. Fibers with these ranges of radii and Δ% enable transmission in the $LP_{02}$ mode.

In accordance with another preferred embodiment, the waveguide fiber comprises:

(a) an effective area in the range between about 50 $\mu m^2$ and 90 $\mu m^2$ at about 1550 nm and in the $LP_{02}$ mode, (b) a dispersion value at about 1550 nm and in the $LP_{02}$ mode between about −50 and −400 ps/nm/km, and (c) a dispersion slope value at about 1550 nm and in the $LP_{02}$ mode between about −0.01 and −20 ps/nm²/km.

Other preferred values of effective area, dispersion, dispersion slope, kappa or combinations thereof are more fully described in the specification and appended claims.

According to another embodiment of the invention, a dispersion compensating optical waveguide includes a plurality of core segments, the refractive index profile of which is selected to exhibit an effective area between about 30 $\mu m^2$ and 150 m² wherein the dispersion compensating optical waveguide is capable of propagating light in the $LP_{02}$ mode a sufficient distance at about 1550 nm, upon being converted from an $LP_{01}$ mode, to be capable of compensating for dispersion of a length of fiber transmitting in the $LP_{01}$ mode. Preferably, the fiber transmitting in the $LP_{01}$ mode is a long-haul waveguide having a length greater than about 25 km. More preferably, the transmission fiber may be a fiber, such as LEAF® optical fiber available from Corning Incorporated, that exhibits an effective area greater than about 65 $\mu m^2$ in the $LP_{01}$ mode. Preferably, the DC optical waveguide has a length between about 0.5 km and about 3 km, thus providing a segment that is short enough to conveniently package within a compact dispersion compensating module.

In accordance with another embodiment of the invention, a dispersion compensating module is provided including a reflective fiber grating to convert light propagating in a first mode into light propagating in a second mode. Most preferably, the module comprises a coupler adapted to couple a first fiber that is adapted to propagate light in a first mode with a second fiber. In accordance with this aspect of the invention, a reflective fiber grating is operatively connected to the coupler; the fiber grating being adapted to convert light propagating in the first mode into a second mode. In the compensating module in accordance with another aspect thereof, the second fiber is operationally and optically coupleable through the coupler to the reflective fiber grating and the second fiber may propagate light in a second mode. According to a preferred embodiment of the invention, the first fiber is a transmission fiber and the second fiber is a dispersion compensating fiber. Preferably, the first mode is an $LP_{01}$ mode and the second mode is an $LP_{02}$ mode.

In accordance with a preferred embodiment, the dispersion compensating module comprises a mode converter and a dispersion compensating fiber. The mode converter is operatively coupleable with a transmission waveguide; the transmission waveguide being adapted to propagate light in a first mode. Within the mode converter is a reflective fiber grating capable of converting the first mode into a second mode. A dispersion compensating fiber is operatively coupled to the mode converter and the dispersion compensating fiber is adapted to propagate light in the second mode to compensate for dispersion of the transmission fiber.

According to another embodiment of the invention, the dispersion compensating module comprises a mode converter adapted for operatively coupling with an optical transmission waveguide, the transmission waveguide propagating light in a first mode. The mode converter includes a reflective fiber grating that is adapted to convert the first mode into a second mode. The module also includes a dispersion compensating fiber, operatively coupled to the mode converter, adapted to propagate light in the second mode. The module preferably also includes a coupler adapted to couple light propagating in the first mode into the reflective fiber grating and which is further adapted to couple light propagating in the second mode into the dispersion compensating fiber.

In accordance with another embodiment of the invention, an optical mode converter is provided comprising an optical fiber coupler adapted to operatively couple light propagating in a first mode in a first fiber into a second fiber, and a reflective fiber grating operatively coupled to the second fiber, the grating being capable of converting light propagating in a first mode into a second mode wherein the second fiber extends from the optical fiber coupler and is adapted to propagate light in the second mode. Preferably, the first fiber is a fiber pigtail adapted to operatively couple to an optical transmission waveguide propagating light in an $LP_{01}$ mode. Most preferably, the reflective fiber grating converts the $LP_{01}$ mode into an $LP_{02}$ mode; the fiber grating being operatively coupled with the pigtail through, for example, an optical fiber coupler.

In one embodiment, a fiber interconnect operatively couples the reflective fiber grating with a DC fiber; the DC fiber adapted to propagate light in the $LP_{02}$ mode. The reflective fiber grating preferably includes a plurality of longitudinally spaced portions that have been exposed to UV radiation to vary those respective portions' refractive index. Preferably, the longitudinal spacing of the portions are spaced at intervals that vary by up to 3% from a beginning to an end of the reflective fiber grating. It should be recognized that a broader spacing variation may be utilized if a broader grating bandwidth is desired. Various characteristics of the preferred conversion fiber upon which the fiber grating is written are described herein. In one embodiment, the conversion fiber comprises boron, germanium and phosphorous doped silica.

According to another embodiment of the invention, an optical fiber coupler is provided wherein the propagation constants (in a particular mode) of a first and second fiber therein are matched by stretching a portion of one of the fibers prior to fusion thereof. In more detail, the coupler comprising a first optical fiber within the coupler having a first propagation constant in a first mode, and a second fiber within the coupler, the second fiber having a second propagation constant in an undeformed portion thereof and in the first mode that is different than the first propagation constant, the second fiber including a necked-down portion formed on a glass portion thereof which is formed prior to fusion of the fibers, the necked-down portion having a dimension such that a third propagation constant in the necked-down portion substantially matches the first propagation constant wherein coupling of light between the fibers in the first mode is enhanced. Further details of the dispersion compensating module and the mode converter, coupler and various fibers included therein are in the attached disclosure, claims and drawings to follow.

DEFINITIONS

The following definitions are in accord with common usage in the art.

The refractive index profile is a plot of the relationship between refractive index and waveguide fiber radius. It is generally provided as a Δ% as defined below.

A segmented core is one that has at least a first and a second waveguide core segment positioned at a radial distance from the waveguide centerline. Each segment has a respective refractive index profile.

The radii of the segments of the core are defined in terms of the beginning and end points of the segments of the refractive index profile. FIG. 5, for example, illustrates the definitions of radii R1, R2 and R3 used herein. The radius R1 of the first index segment 18, is the length that extends from the waveguide centerline to the point at which the profile, when extrapolated with a tangential line, intersects the innermost portion of a tangentially extrapolated portion of the next adjacent segment. The outer radius R2 of second segment 19 extends from the centerline to an outermost radial point of the second segment at which the tangentially extrapolated edge portion of the inner radius of the third core segment intersects the outermost point of the second segment. The outer radius R3 of third segment 20 extends from the centerline to the radius point at which the descending tangential portion of the third core segment intersects the zero Δ%, if for example, there are additional segments utilized. The width of each segment 18, 19, and 20 respectively is measured with respect to the radii R1, R2–R1, and R3–R2, respectively.

The effective area is defined herein as:

$$A_{eff} = 2\pi (\int E^2 \, r \, dr)^2 / (\int E^4 \, r \, dr),$$

where the integration limits are 0 to ∞, and E is the electric field associated with the mode in which the light is propagated and r is the radius within the integrated interval.

The term Δ% represents a relative measure of refractive index defined by the equation:

$$\Delta\% = 100 \times (n_i^2 - n_c^2)/(2n_i^2)$$

where $n_i$ is the refractive index in any region i along the profile, and $n_c$ is the refractive index of the cladding region, unless otherwise specified.

It is an advantage of the present invention that the DC waveguide fiber has greater effective area than prior DC fibers, thus providing lower nonlinear effects. This higher effective area is achieved by light transmission in the $LP_{02}$ mode. This has the advantageous effect of reducing nonlinearities in the signal transmission.

It is another advantage of the present invention that the DC waveguide fiber propagates light signals in the higher order $LP_{02}$ mode enabling high negative dispersion and negative slopes and thereby allowing compensation with shorter lengths of DC fiber. For example, in a preferred embodiment for use with LEAF® optical fiber, the length of DC fiber required may be less than $\frac{1}{100}^{th}$ of the transmission fiber's length. This enables shorter DC fiber lengths and thus lower losses as well as smaller DC modules. In particular, because the $LP_{02}$ transmission mode exhibits circular symmetry (an even symmetry mode), it is desirably very tolerant of circularity variations in the fiber. The present invention dispersion compensating fiber enables their use in such devices over a wide range of wavelengths (larger bandwidth) and with low attenuation.

Therefore, the present invention solves the problem of mode splitting when transmission is propagated in the prior art $LP_{11}$ mode.

An advantage of another embodiment of the invention is that the mode conversion and dispersion compensation is accomplished with an all fiber based approach, thus enabling compact, robust and cost effective mode conversion and dispersion compensation.

Other aspects and advantages of the invention will be understood with reference to the following detailed description, claims and appended drawings.

DETAILED DESCRIPTION OF THE INVENTION

Figure 1:
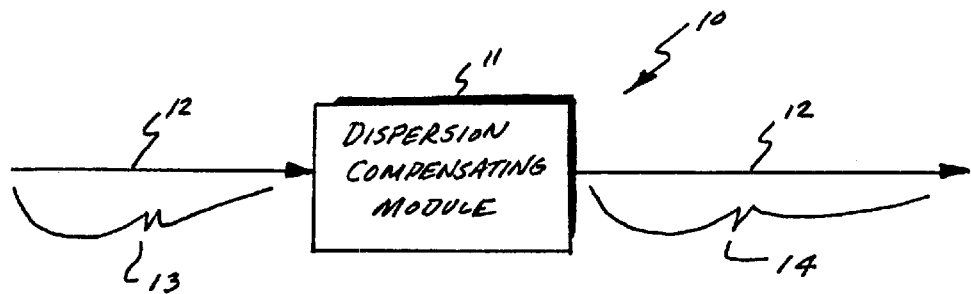
FIG. 1 illustrates a block diagram of a portion of an optical transmission system of the prior art with which the present invention has utility.
Figure 2:
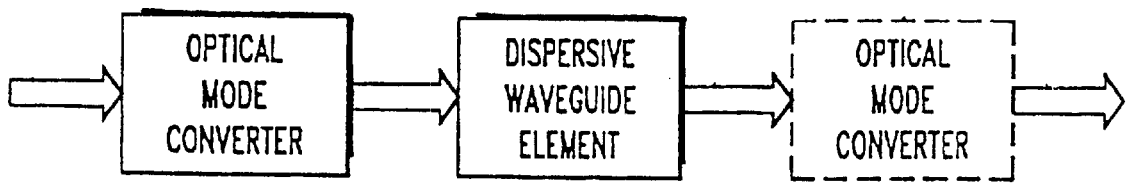
FIG. 2 is a diagram illustrating the interconnection of a dispersive waveguide element with an optical mode converter according to the prior art.
Figure 3:
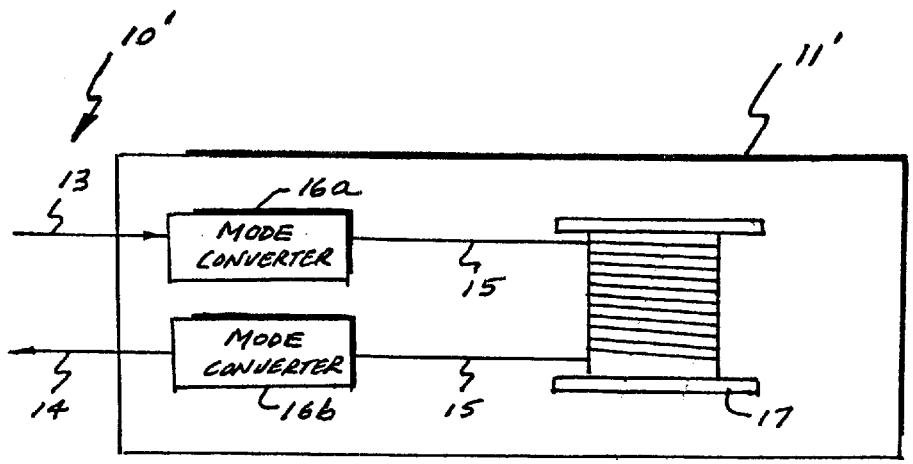
FIG. 3 is a block diagram of a dispersion compensating module in accordance with the present invention.

The dispersion compensating optical waveguide 15 in accordance with one aspect of the present invention is best illustrated with reference to FIGS. 3–11 herein. Referring first to FIG. 3, is shown a portion of a high data rate telecommunication system 10' including a primary portion of transmission fiber 13, such as LEAF® optical fiber available from Corning Incorporated, which exhibits a positive chromatic dispersion and a positive dispersion slope. The transmission fiber terminates, and a new transmission portion 14 starts, at a dispersion compensating module 11'. The portion 13 prior to the module 11' is of a sufficient length such that the fiber's dispersion properties have distorted the signal to the point that dispersion compensation is desirable. The length of the portion 13 may be, for example, greater than about 25 km and, more preferably, on the order of about 50 km–100 km or more. The system may, for example, include many dispersion compensating modules 11' at various positions along any particular transmission segment.

In particular, within the dispersion compensating module 11', as best illustrated in FIG. 3, a mode converter 16a converts a first mode, such as the fundamental $LP_{01}$ mode, transmitted in and propagated by the first segment 13 of transmission fiber to a second, higher-order $LP_{02}$ mode. The signal is then propagated in the $LP_{02}$ mode in the dispersion compensated fiber 15 a sufficient distance, i.e., through an appropriate length of DC fiber 15, to partially or completely compensate for the dispersion caused by the primary transmission fiber portion 13. The fiber 15 may be wound about a spool or cylinder 17 or other like holder preferably mounted to the module 11 to enable simple and compact module construction. Advantageously, by propagating in the $LP_{02}$ mode, large dispersion slope compensation is possible and smaller lengths of the DC fiber 15 are required to accomplish dispersion compensation. Typically, 0.5 km to 3.0 km of the DC fiber 15 are desired to accomplish the dispersion compensation when an $LP_{02}$ mode is used for compensating for the dispersion effects of LEAF® optical fiber, for example.

Preforms for such DC optical fibers 15 may be made using any of the known methods in the art, including chemical vapor deposition techniques such as OVD, PCVD, MCVD and VAD. In a preferred embodiment, a soot preform is manufactured using an OVD technique having the desired refractive index profile in accordance with the present invention. This soot preform is then consolidated in a consolidation furnace and drawn into a DC waveguide 15 as is well understood by those of skill in the art. According to a preferred aspect, the core portion, i.e., that portion carrying most of the light signal and defined by the profiles herein, is prepared as a blank (otherwise referred to as a core cane), consolidated and then overclad with silica soot to form the resultant preform which is again consolidated and drawn into the optical waveguide. It should be understood that the core profiles described herein may be developed in a multiple step method where a first core cane is drawn, another core segment is deposited, consolidated, and again drawn into core cane.

Figure 4:
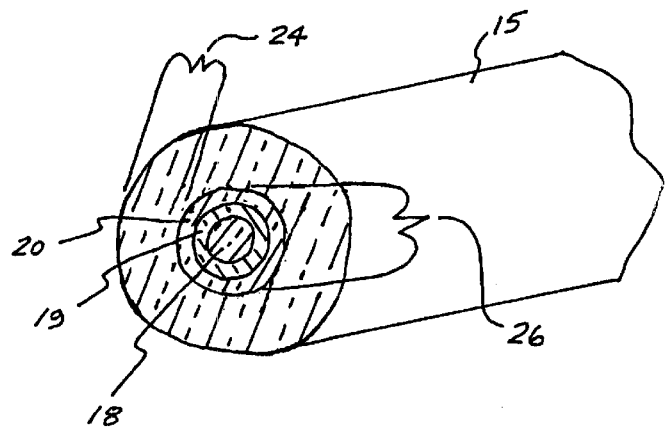
FIG. 4 is a perspective view of a portion of the dispersion compensating optical fiber according to the invention illustrating core and clad segments.
Figure 5:
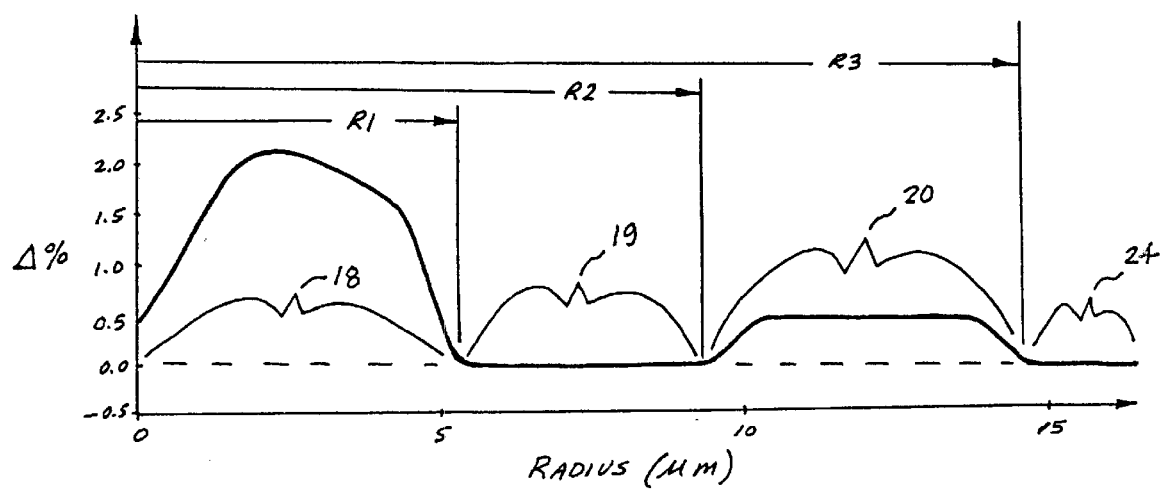
FIGS. 5–11 are graphs illustrating various index profiles plotting Δ% vs. core radius of several DC optical waveguides made in accordance with the present invention.
Figure 6:
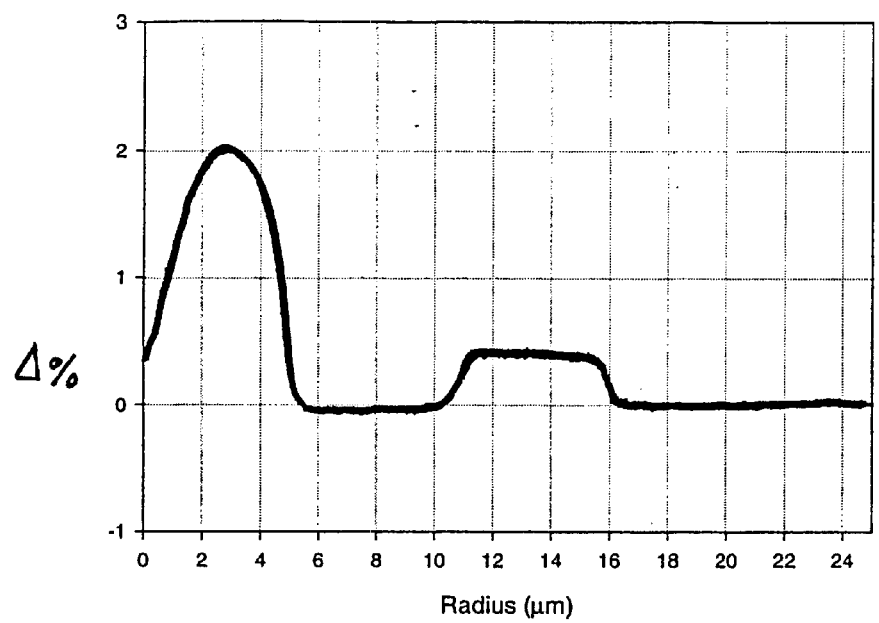
Figure 7:
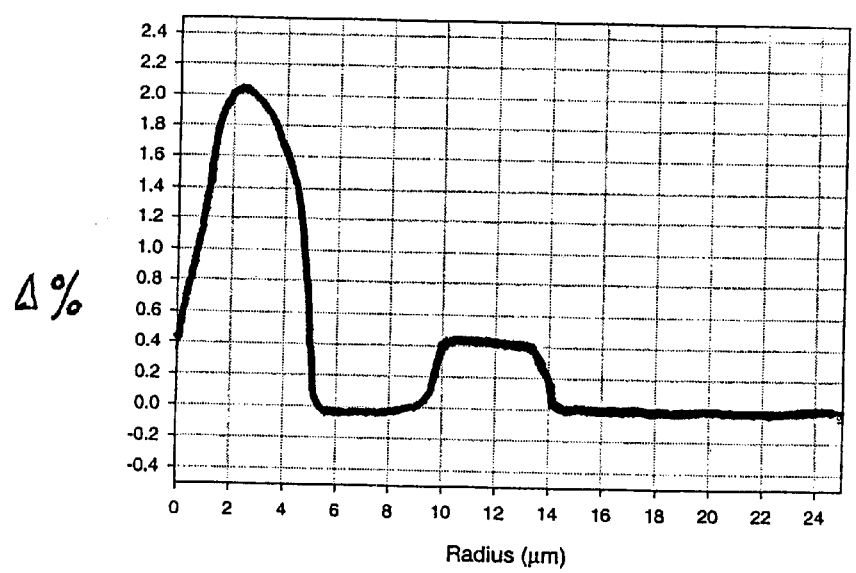
Figure 8:
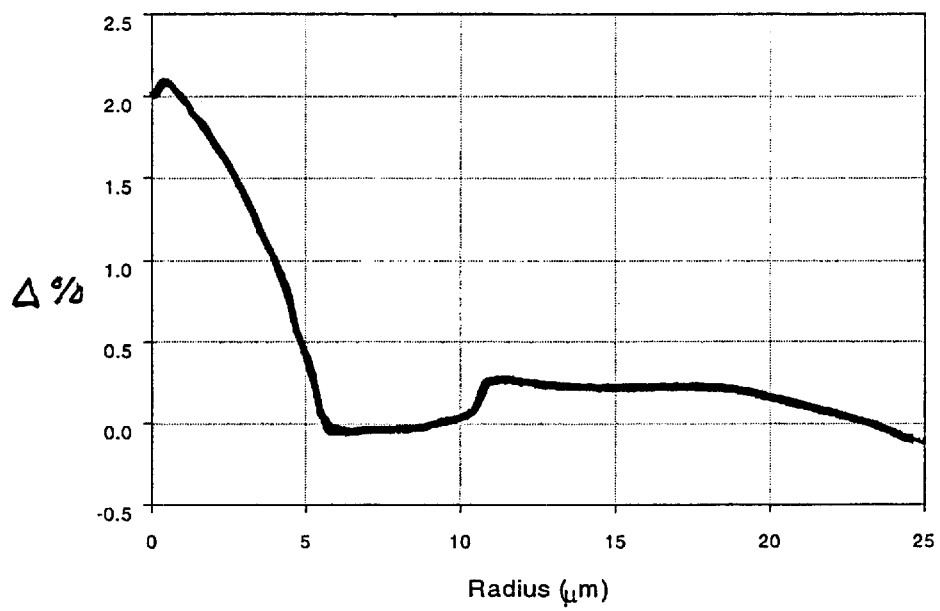
Figure 9:
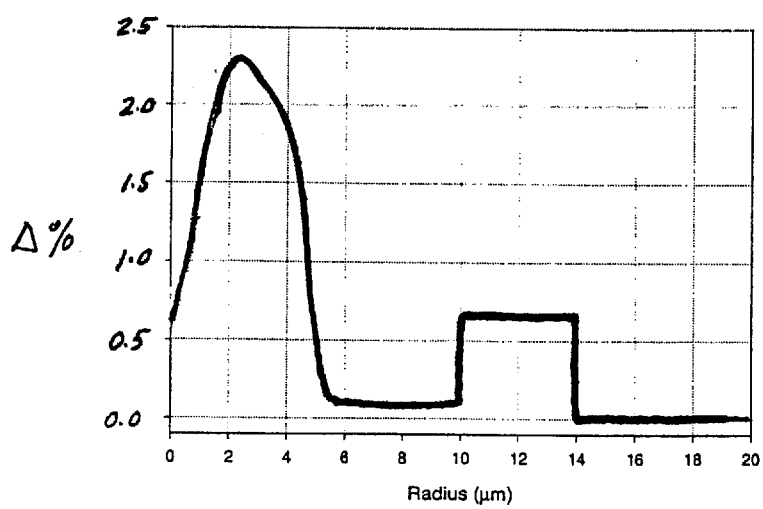

According to the invention, the DC optical fiber 15 includes the following characteristics. First, the fiber preferably includes a plurality of core segments, preferably at least three, such as first, second, and third, radially-spaced segments, 18, 19, and 20, respectively, as best illustrated in FIG. 4. First, second, and third segments 18, 19 and 20 generally make up the so-called physical core 26. The first core segment 18 has the shape of a nearly continuous length rod, whereas the second and third core segments 19, 20, respectively, have the shape of nearly continuous length cylinders surrounding the rod and having predetermined width dimensions of their radial walls. The DC waveguide 15 according to the invention also includes a clad portion 24. This clad portion 24 is preferably pure silica and generally forms the basis for determining Δ% as defined herein above. The core segments 18, 19, and 20 for one embodiment, as best shown in FIG. 4 and 5, are generated at different steps during the formation of the preform by the addition of various dopants in predetermined concentrations. For example, segments 18 and 20 preferably comprise germanium and silica. Segment 19 is preferably undoped such that it exhibits a Δ% of substantially zero. Alternately, the segment 19 may comprise some small percentage of germanium. In an alternative embodiment, fluorine may be added to down dope the second segment 19 slightly. The cladding 24 preferably consists of pure silica. The DC fiber 15 achieves its desired characteristics to enable the propagation of the $LP_{02}$ mode because of its profile characteristics. In another aspect, the DC fiber 15 in accordance with the invention is also capable of propagating in an $LP_{11}$ mode.

In particular, according to a first aspect, the fiber includes a plurality of core segments, the refractive index profile of which is selected to exhibit properties such that it is capable of propagating a signal in an $LP_{02}$ mode. The signal is transmitted by the DC optical waveguide 15 a sufficient distance (through an appropriately selected length of fiber—preferably 0.5 km–3.0 km, upon conversion to the second, higher-order $LP_{02}$ mode, to compensate for dispersion of an incoming portion of a transmission optical waveguide 13 (FIG. 3). Typically, the portion 13 has a length greater than 25 km and propagates light in a first, lower-order $LP_{01}$ mode.

According to one preferred aspect, the DC waveguide 15 exhibits a kappa value κ between about 10 nm and about 500 nm. Kappa κ is defined as the ratio of dispersion in the $LP_{02}$ mode at 1550 nm divided by dispersion slope in the $LP_{02}$ mode at 1550 nm. More preferably, the value κ is in the range between about 30 nm and 70 nm.

According to another aspect of the invention, the DC waveguide 15 comprises an effective area greater than about 30 $\mu m^2$, and more preferably greater than about 60 $\mu m^2$ in the $LP_{02}$ mode and at about 1550 nm. Preferably, the effective area is in the range between about 30 $\mu m^2$ and 150 $\mu m^2$, and more preferably yet between about 50 $\mu m^2$ and 90 $\mu m^2$ at 1550 nm.

The DC fiber 15 preferably exhibits a dispersion value at 1550 nm and in the $LP_{02}$ mode of between about −10 and −1000 ps/nm/km, and more preferably between about −50 and −400 ps/nm/km. The dispersion slope value of the DC fiber 15 at 1550 nm and in the $LP_{02}$ mode is preferably less than −0.01, and more preferably between about −0.01 and −20 ps/nm$^2$/km, and more preferably yet between about −1.0 and −10 ps/nm$^2$/km.

As illustrated in FIGS. 4 and 5, the DC waveguide 15 preferably exhibits at least three core segments which preferably have the following physical dimensions. The first core segment 18 has an outer radius dimension R1 in the range between about 3 $\mu m$ and 9 $\mu m$, and more preferably between about 4 $\mu m$ and 8 $\mu m$. A second core segment 19 preferably comprises a width dimension (R2–R1) in the range between about 2 $\mu m$ and 8 $\mu m$, and more preferably between about 4 $\mu m$ and 6 $\mu m$. Preferably, the second core segment 19 has an outer radius R2 between about 10 $\mu m$ and 20 $\mu m$, and more preferably between about 7 $\mu m$ and 13 $\mu m$. The third core segment 20 preferably includes a width dimension (R3–R2) in the range between about 1 $\mu m$ and 10 $\mu m$, and more preferably between about 4 $\mu m$ and 8 $\mu m$. The outer radius R3 of the third segment is preferably between about 10 $\mu m$ and 25 $\mu m$, and more preferably between about 12 $\mu m$ and 18 $\mu m$.

According to a preferred embodiment of the invention the first core segment 18 comprises refractive index peak Δ% $n_1$ of greater than about 1.5%, and more preferably greater than 2.0%. The peak Δ% $n_1$ of the first core segment includes a range between about 1.0% and 2.5%, and more preferably between 1.5% and 2.5%. In the embodiment of FIG. 4, the first core segment 18 exhibits a Δ% of less than about 1.0 at the centerline of the DC waveguide 15 and a Δ% peak (preferably greater than 1.5%) at a radius location that is greater than 1 $\mu m$. The first core segment 18 preferably has a peak Δ% preferably positioned at between about 1 $\mu m$ and 3 $\mu m$.

In a preferred embodiment of the invention, the second segment 19 preferably exhibits a peak Δ% $n_2$ greater than zero. However, $n_2$ less than about 0.3% but preferably greater than or equal to −0.5%, and more preferably less than 0.3% and greater than −0.1% will also provide the desired properties. The third core segment 20 preferably comprises a Δ% $n_3$ in the range between about 0.2% and 1.0%, and more preferably between 0.3% and 0.6%.

In all cases, it is preferable that the peak Δ% $n_1$ of a first core segment 18 be greater than the peak Δ% $n_3$ of the third core segment 20. Furthermore, it is preferable that the peak Δ% $n_3$ of the third segment be greater than the peak Δ% $n_2$ of the second core segment 19. Preferably, the peak Δ% of first, second, and third core segments are all greater than or equal to zero.

Table 1 below sets forth below a number of examples of DC waveguide fibers 15 made in accordance with the present invention that have properties enabling the transmission of a higher-order $LP_{02}$ mode, for example, within a dispersion compensating module. It should be understood that the examples that follow are illustrative only and that a wide variety of variants with similar characteristic to those described herein may achieve propagation of light signals in the $LP_{02}$ mode within the DC waveguide fiber 15 such that dispersion pensation may be achieved.

TABLE 1

| Example Number | Dispersion (ps/nm/km) at 1550 nm and $LP_{02}$ | Kappa (nm) | Effective Area ($\mu m^2$) at 1550 nm and $LP_{02}$ |
| --- | --- | --- | --- |
| 1 | −941 | 34 | 94 |
| 2 | −490 | 58 | 92 |
| 3 | −109 | 48 | 69 |
| 4 | −103 | 54 | 79 |
| 5 | −125 | 53 | 64 |
| 6 | −183 | 69 | 92 |
| 7 | −171 | 87 | 147 |

Figure 10:
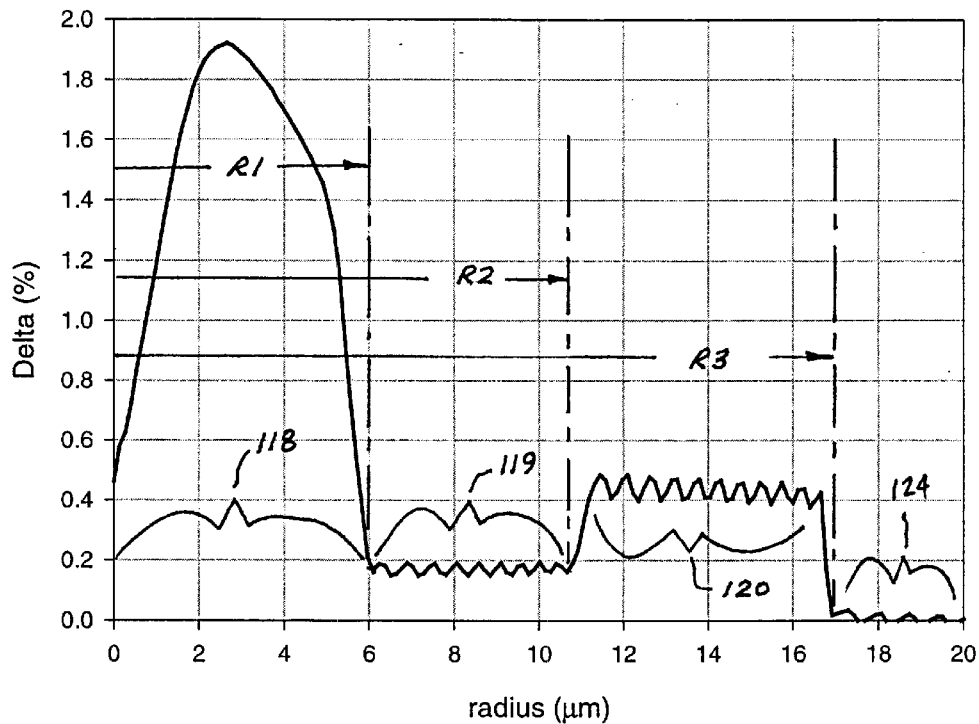
Figure 11:
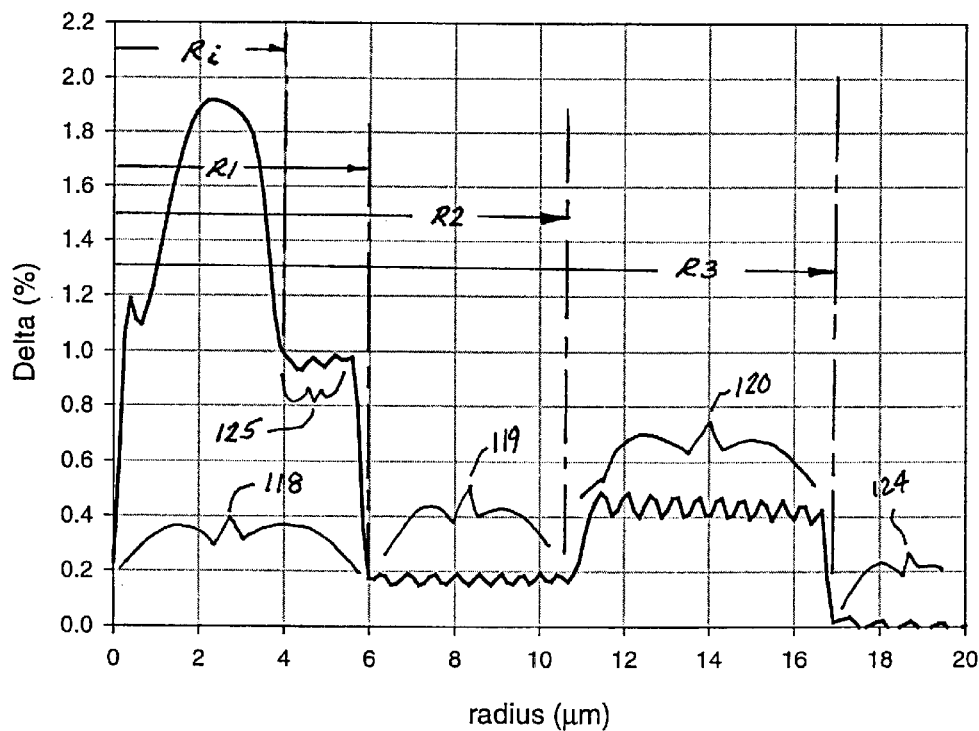

FIGS. 6–11 illustrate several additional profile plots of Δ% versus radius dimension for the above-listed example numbers. FIGS. 6, 7, 8 and 9 relate to example numbers 1, 2, 4, and 5, respectively. FIGS. 10 and 11 correspond to example numbers 6 and 7, respectively. FIG. 4 corresponds to example number 3. Each of the profile plots 6–9 exhibit properties as heretofore mentioned with reference to FIG. 4 such that they are capable of propagating light in the $LP_{02}$ mode.

Figure 12:
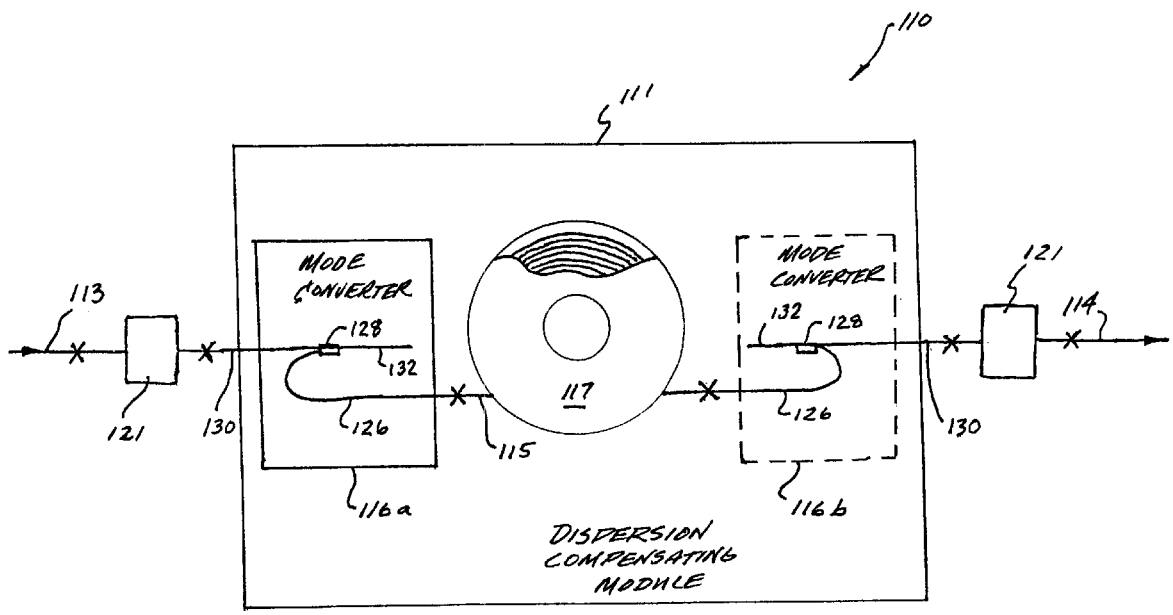
FIG. 12 is a block diagram of a dispersion compensating module including the mode converter, coupler, conversion fiber and dispersion compensating fiber in accordance with the present invention.

FIG. 10 illustrates another embodiment (example 6) of DC fiber 115 which exhibits a refractive index profile which is desirable for compensating for dispersion of a transmission fiber 113 in a transmission system 110, for example, as is illustrated in FIG. 12. The fiber 115 includes a first core segment 118 having an outer radius R1 in the range between about 3 $\mu$m and 9 $\mu$m, more preferably between about 4 $\mu$m and 8 $\mu$m, and most preferably about 6 $\mu$m. The first segment preferably includes a Δ% peak of greater than 1.5% and more preferably greater than 2.0%. A second core segment 119 within the fiber has an outer radius R2 in the range between about 7 $\mu$m and 13 $\mu$m, and more preferably between about 10 $\mu$m and 12 $\mu$m, and most preferably about 11 $\mu$m. The second segment 119 preferably includes a Δ% peak in the range between about 0.3% and −0.5% and more preferably between 0.3% and 0.1%, and most preferably about 0.2%. Preferably, a third core segment within the fiber 115 has an outer radius between about 10 $\mu$m and 25 $\mu$m, and more preferably between 14 $\mu$m and 20 $\mu$m, and most preferably about 17$\mu$m. Preferably the third segment 120 includes a Δ% peak in the range between about 0.2% and 0.8%, more preferably between 0.3% and 0.7%, and most preferably between 0.5% and 0.6%. The fiber preferably includes germania doped silica in segments 118, 119, and 120; the amounts being varied per each segment to achieve the various Δ%.

FIG. 11 illustrates a refractive index profile of another embodiment of dispersion compensating fiber 115 in accordance with the present invention that is particularly effective for use with the mode converters 116a, 116b described with reference to FIG. 12. Thus, the profile will be explained in detail with reference to both FIGS. 11 and 12. As before described herein, the DC fiber 115 includes a profile including first 118, second 119 and third 120 core segments and a clad portion 124 encircling the last core segment. The preferred radii and Δ%'s of the segments 118, 119, 120 are as heretofore described with reference to FIG. 11. However, in this embodiment of fiber, the first core segment 118 preferably includes a sub-segment 125 with a lower Δ%. The first segment 118 preferably has an outer radius R1 in the range between about 4 $\mu$m and 8 $\mu$m and a Δ% peak of greater than about 1.5%. The sub-segment segment 125 within the first core segment 118 has an inner radius R1 of between about 3 $\mu$m and 6 $\mu$m and a Δ% peak in the range between about 0.6% and 1.4%, and more preferably between about 0.8 and 1.2%. The step or sub-segment 125 in the first segment is provided such that the profile of the DC fiber 115 is better matched to the fiber interconnects 126 which serves the function of interconnecting between the couplers 128 and the DC fiber 115 or between the conversion fiber 132 and the DC fiber. The fiber interconnect propagates light in the $LP_{02}$ mode to and from the DC fiber 115 and to and from the couplers and conversion fiber 132. Thus, the interconnect 126 serves an interconnect function by transmitting the light signal between the coupler and the DC fiber 115. Matching the profiles of the fiber interconnect and the DC fiber desirably lowers the losses and reduces mode coupling in the splice (labeled X).

Figure 13:
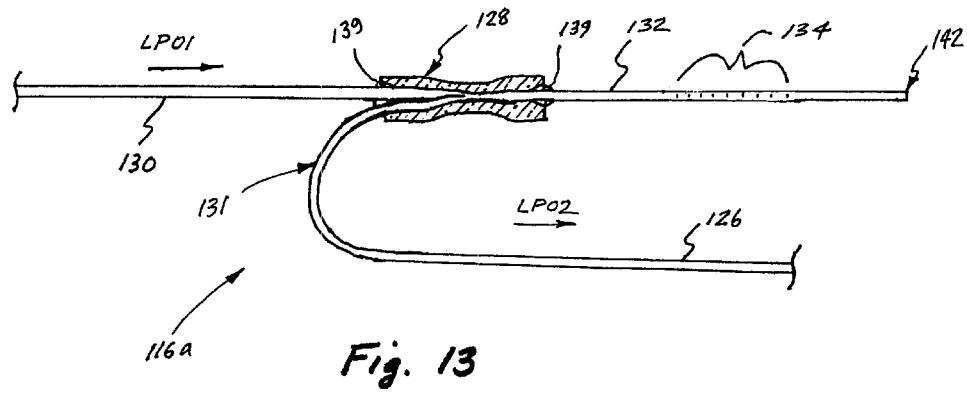
FIG. 13 is a partially sectioned side view illustrating the mode converter in accordance with an aspect of the present invention.

As best illustrated in FIGS. 12 and 13, the mode converters 116a, 116b, are preferably housed within an enclosure of the DC module 111. The packaging may be of any appropriate shape. Optionally, the converters 116a, 116b, may be separately packaged and interconnected to the DC fiber and transmission fibers or other components by any convenient means. Each mode converter 116a, 116b, preferably includes a pigtail 130 which is spliced to or otherwise interconnected either to an amplifier section 121 or directly to the transmission fiber 113, 114. The pigtail 130 also interconnects to the DC fiber 115 by conventional splicing technology; the splices being designated as X's in FIG. 12. In any event, the mode converters 116a, 116b, are operatively connected to the transmission fiber and also to the DC fiber 115. The operative connection to the transmission fiber is preferably through an amplifier stage 117. However, it should be recognized that the mode converter in accordance with the invention is capable of use in a multitude of applications where conversion from a first mode into a second mode is desired. The operative connection to the DC fiber 115 is through fiber interconnects 126.

Now referring to FIG. 13 are shown the details of the mode converters 116a, 116b, in accordance with one embodiment of the invention. It should be recognized that the mode converter may be packaged in any appropriate manner and may be an unpackaged subassembly within the DC module 111. With reference to FIG. 13, the details of one mode converter 116a will be described. It should be understood that the mode converter 116b, is similar in construction; the differences in comparison thereto being only in the orientation of the reflective fiber grating. The converter 116a includes a pigtail 130 adapted for splicing to operatively couple to another component, such as an amplifier stage (e.g., 121) or to incoming transmission fiber (e.g., 113 ). The pigtail 130 may be manufactured of any suitable fiber. One preferable pigtail fiber is a single mode fiber, such as SMF-28™ optical fiber, available from Corning Incorporated of Corning, N.Y. The pigtail 130 is interconnected to an optical coupler 128. The coupler 128 also has interconnected to it a fiber interconnect 126. The fiber interconnect 126 is a fiber which functions to operatively couple and interconnect the coupler 128 to the DC fiber 115. This fiber interconnect 126 is also optically coupled to a converting fiber 132 that includes thereon a reflective Bragg grating 134. The coupler 128 serves the purpose of coupling the light propagating in a first fiber, such as in the fiber pigtail 130 into one or more fibers, such as the converting fiber 132.

Figure 18:
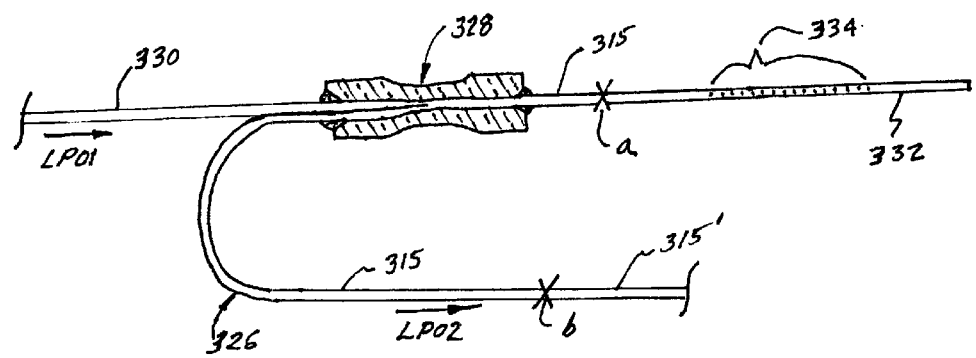
FIG. 18 is a partially sectioned side view illustrating another embodiment of mode converter in accordance with another aspect of the present invention.

In this case, the coupler 128 operatively couples the light being propagated in a first mode, such as a fundamental or lower order mode, for example, the $LP_{01}$ mode, in the pigtail 130 into the converting fiber 132 where it is converted by the reflective grating 134 into light propagating in an $LP_{02}$ mode. In the preferred embodiment of the converter, the light signal is reflected back into the coupler 128 by the reflective fiber Bragg grating 134 written onto the conversion fiber 132. The coupler 128 then operatively couples the light signal propagating in the $LP_{02}$ mode into the fiber interconnect 126. This fiber interconnect 126 operatively couples and interconnects with the $LP_{02}$ propagating DC fiber 115, preferably a DC fiber exhibiting refractive index profiles such as those described with reference to FIGS. 5–11. FIGS. 13 and 18 illustrate several embodiments of coupler assemblies illustrating the operative connections to the fiber interconnect 126 and the conversion fiber 132. It should be understood that the interconnect 126 and the conversion 132 fibers may be separate fibers that are spliced together as shown in FIG. 18 or the same fiber as shown in FIG. 13. Preferably, upon traveling the appropriate distance through the DC fiber, some or all of the dispersion of the transmission fiber 113 is compensated for.

Figure 14:
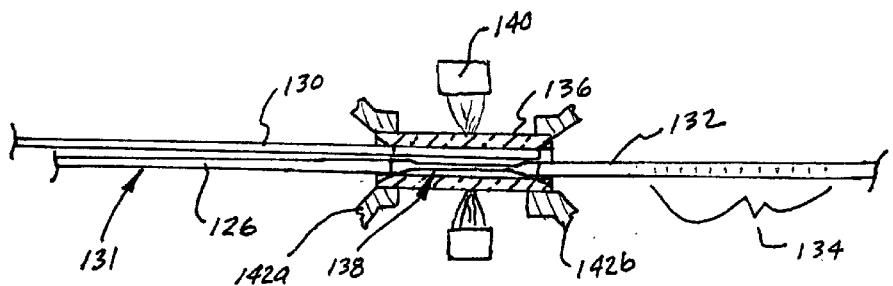
FIG. 14 is a partially sectioned side view illustrating various apparatus used to manufacture the mode converter in accordance with the present invention.

In one embodiment, as best illustrated by FIG. 14, the coupler 116a is manufactured by inserting a pigtail 130, preferably a single-mode fiber, into a tubular glass cane sleeve 136 of made up of preferably 4%–8% boron doped silica glass. The sleeve 136 preferably has a length of about 70–72 mm, an inner diameter dimension of about 0.27 mm, and an outer diameter dimension of about 2.6 mm. A pass through fiber 131 made up of the fiber interconnect portion 126 is also inserted through the cane sleeve 136 and a stripped portion is appropriately positioned adjacent to the pigtail 130. The sleeve 136 is held by moveable chuck members 142a, 142b that clamp onto each end of the sleeve 136 and that may be released and removed when desired. The fiber 131 passing entirely through the sleeve 136 includes a short portion 137 which has the protective polymer coating 133 stripped therefrom. The revealed glass in that portion 137 is then heated by a longitudinally moving burner and pulled under tension, preferably prior to insertion into the sleeve 136 and prior to fusion of the fibers 130, 131, thereby forming a necked-down portion 138 of preferably approximately constant dimension within the necked-down portion.

The necked-down portion 138 is preferably between about 30% and about 60% of the original diameter of the glass portion of the fiber 131 and is preferably slightly shorter than the length of the cane sleeve 136. In a preferred embodiment, the fiber interconnect 126 is the same profile as the conversion fiber 132 and together make up the pass through fiber 131.

The amount of necking down required is determined based upon the propagation constant β of the first fiber, e.g., the pigtail 130. Essentially, the second fiber 131 is precisely stretched under a longitudinally moving methane/oxygen flame until the propagation constant β of the second fiber 131 in the necked down area 138 is approximately matched with the propagation constant β of the first fiber 130 fiber in the $LP_{01}$ mode and at 1550 nm. The stretching and necking down affects the core diameter which, in turn, affects the propagation constant β. Matching the propagation constants in the $LP_{01}$ mode between the two fibers 130, 131 with different refractive index profiles improves the $LP_{01}$ mode coupling between the fiber thereby desirably minimizing coupling losses.

Figure 15:
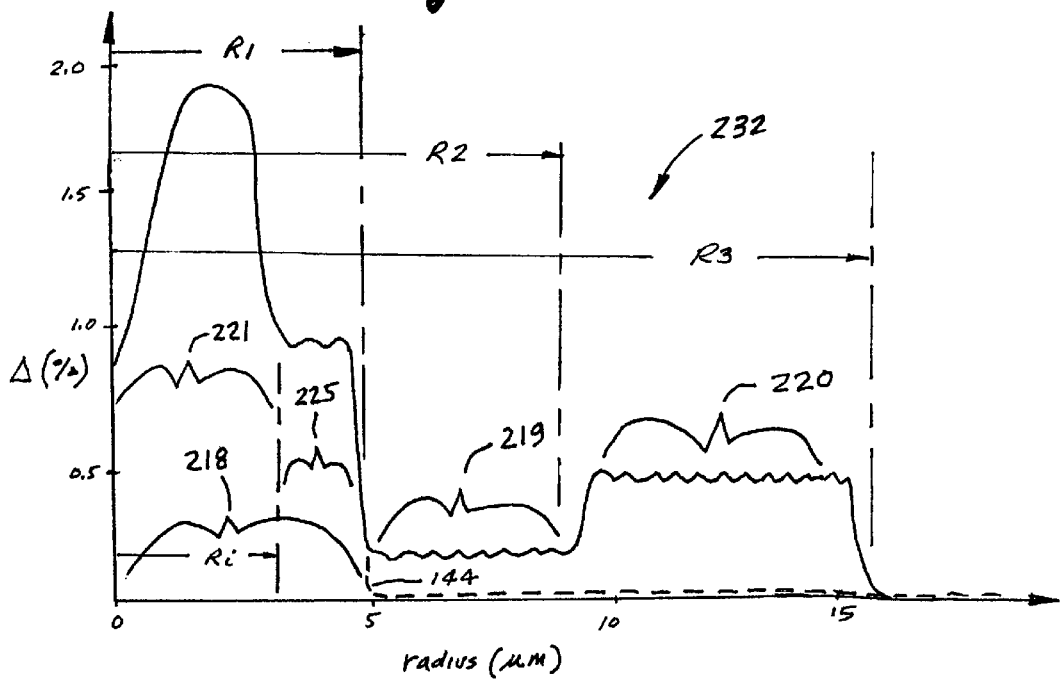
FIG. 15 is a graph illustrating a refractive index profile plotting Δ% vs. core radius of a conversion fiber in accordance with an aspect of the present invention.
Figure 16:
FIG. 16 is a side view illustrating a stripped and stretched portion of a fiber utilized with the coupler in accordance with an aspect of the present invention.
Figure 17:
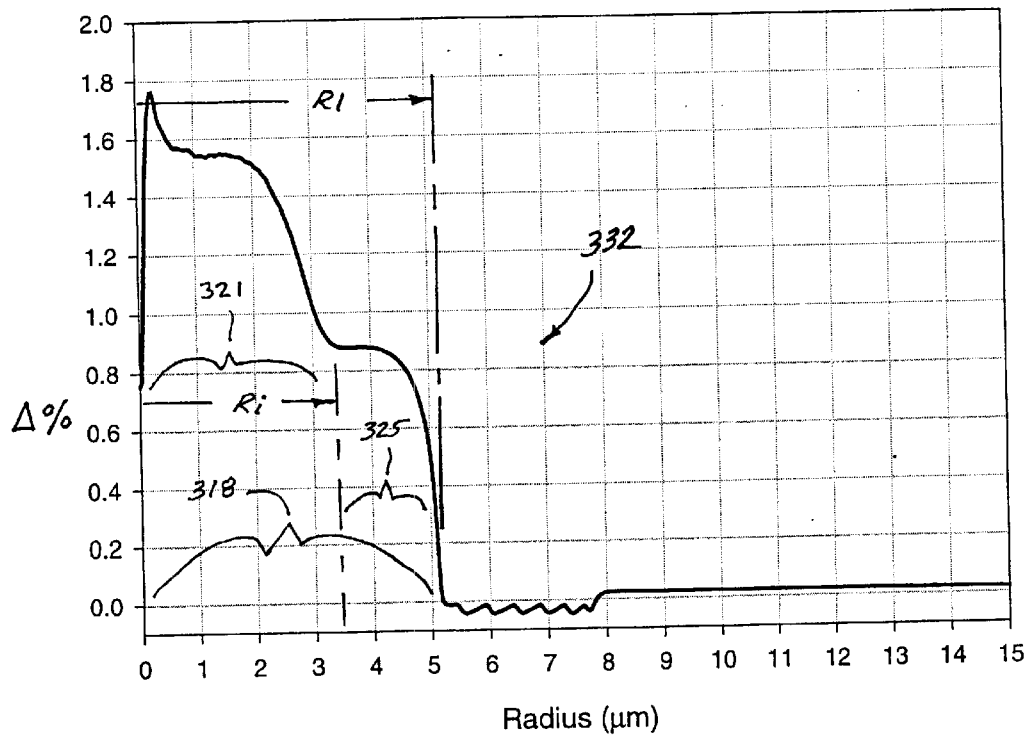
FIG. 17 is a graph illustrating a refractive index profile plot of Δ% vs. core radius of a second embodiment of a conversion fiber in accordance with an aspect of the present invention.

The fibers 130, 131 are then appropriately positioned within the sleeve 136, the assembly including the end of fiber 130, the necked down portion 138 and the sleeve 136 are then locally heated by a burner 140, such as a methane and oxygen ring-type flame burner. Upon the assembly being heated, the sleeve 136 collapses onto the fibers 130 and 131 and fuses them together. While keeping the fibers and sleeve 136 above the glass transition temperature, the chuck members 142a, 142b are separated while still holding the respective ends of the sleeve 136 until the monitored coupling reaches a target dimension. This preferably takes an increase in separation of between about 5 mm and 15 mm. The chuck members 142a, 142b and heat are removed and the resulting coupler 128 is formed as shown in FIG. 13 whereby the various fibers 130, 131 become fused together at the mid-region of the coupler 128. The fiber used for the fiber interconnect 126 and the converter fiber 132 in this embodiment preferably exhibit a profile as shown in FIG. 15 or 17. Adhesive or other potting compound 139 is provided at the respective ends to further secure the fibers 130, 131. It should be recognized that the present invention coupler may be employed anywhere fibers, such as fibers 126 and 130 have a mismatched propagation constant at a particular wavelength. Moreover, although one method has been explained for achieving the necking down feature, other methods may be employed if practicable, such as etching with hydrofluoric acid solution.

For example, in FIG. 18, the fiber pigtail 330 couples into a DC fiber 315 which functions as the pass through fiber; such DC fiber being preferably identical to that described with reference to FIGS. 10 or 11. The fiber 315 is spliced at splice "a" to a converter fiber 332 having the reflective fiber grating 334 as described herein written thereupon. The conversion fiber 332 preferably has the profile described with reference to either FIG. 15 or 17. The fiber interconnect 326 in this embodiment is the DC fiber and at splice "b", the DC fiber is preferably spliced to an identical DC fiber 315'mounted on any type of holder (not shown). The coupler 328 is manufactured as described above with reference to FIG. 14. Further details on manufacturing methods for couplers may be found with reference to U.S. Pat. No. 5,295,211, which is hereby incorporated by reference.

In FIG. 15, a profile of a first embodiment converter fiber 132 is illustrated. This fiber may also be used as the fiber interconnect or the pass through fiber. The fiber attaching to the DC fiber 115 in this case is the pass through fiber 131 and preferably exhibits a profile, at least on an innermost core portion, which is preferably substantially matched in shape to the DC fiber 115. This minimizes the losses and mode coupling in propagating light at the splice between the two fibers.

The fiber 131 preferably includes a profile where R1 of the first segment 218 is in the range between about 3 μm and 8 μm, and most preferably about 5 μm. The first segment 218 preferably includes a first Δ% peak of between about 1.4% and 2.5%, and more preferably between about 1.8% and 1.4%. The second core segment 219 within the fiber has an outer radius in the range between about 6 μm and about 14 μm, more preferably between about 6 μm and about 12 μm, and most preferably about 8 μm. The second segment 219 preferably has a Δ% peak in the range between about 0.4% and −0.5%, more preferably between about 0.4% and about 0.2%, and most preferably about 0.3%. Preferably, a third core segment 220 within the fiber 131 has an outer radius R3 between about 12 μm and about 20 μm, more preferably between about 14 μm and about 18 μm, and most preferably about 16 μm. Preferably the third segment 220 includes a Δ% peak in the range between about 0.6% and about 0.2%, more preferably between about 0. 6% and about 0.3%, and most preferably about 0.4%.

The outer sub-segment 225 within the first core segment 118 preferably includes an inner radius Ri of between about 3 μm and about 6 μm and a second Δ% peak (lower than the first Δ% peak) in the range of between about 0.6% and 1.4%, and more preferably between about 0.8 and about 1.2%. Optionally, the segments 219 and 220 of the fiber 131 may comprise pure silica, and thus a Δ% of zero, as indicated by the dotted line segment labeled 144. The dotted segment 144 is shown slightly above zero for illustration purposes only, but it should be recognized that the Δ% of pure silica segment would be exactly at zero Δ%.

Yet another embodiment of conversion fiber 132 is illustrated in FIG. 17. Again, this described fiber profile may be utilized as the fiber interconnect 126 or the pass through fiber 131. In this embodiment, the profile consists of only segment one 318 with one sub-segment 325. The segment 318 preferably includes a profile where R1 of the first segment 318 is in the range between about 3 μm and about 8 μm, and most preferably about 5 μm The first segment 218 preferably includes a Δ% peak of between about 1.4% and about 1.8%, and more preferably between about 1.8% and about 1.4%. The outer sub-segment 325 within the fiber has an inner radius Ri in the range between about 2 μm and about 6 μm, more preferably between about 2 μm and about 4 μm, and most preferably about 3.5 μm. The sub-segment 325 preferably includes a Δ% peak of between about 0.6% and about 1.2%, and more preferably between about 0.9%. The inner sub-segment 321 preferably includes boron in the range of about 5%–15%, and most preferably about 11%, and germanium in the range between about 25%–35%, and most preferably about 30%.

In the FIG. 15 and 17 embodiments, the outer sub-segment 225, 325 preferably includes phosphorous doped silica in about 15–25% by weight, and most preferably about 21% by weight.

To enable the ease of writing or imprinting the reflective fiber grating 134 onto the conversion fiber 232, 332, the inner region labeled 221, 321 in the first segments 218, 318 of the profile, as illustrated in FIGS. 15 and 17, preferably both include a boron dopant present in about 5%–15% by weight, and most preferably about 11% by weight. The boron is added because of its photosensitivity-enhancing properties in that the gratings may be provided on the innermost core 221, 321 of the conversion fiber 232, 332 by exposure of fiber to ultraviolet radiation. The second core segment 219 and the sub-portion 225, 325 preferably include phosphorous. The sub-segments 225, 325 preferably includes phosphorous in a weight percentage of about 15%–25%, and most preferably about 21%. Second core segment 219 includes phosphorous in the amount of about 6% by weight and no germanium. Segment three 220 preferably includes 6% germanium by weight and no phosphorous. The addition of phosphorous in these above-mentioned segments tends to retard photosensitivity when exposed to UV radiation. Thus, the gratings are, for the most part, written onto the innermost part of the fiber's core, i.e., on sub-segment 221, 321.

The reflective gratings 134 are provided in accordance with the invention by exposing a mask including transverse slots formed therein to UV radiation having a wavelength of about 190 nm to about 270 nm. The transverse slots are oriented perpendicular to the length of the fiber 132 and are positioned in front of the fiber 132 and in close proximity thereto. The exposure mask for writing the gratings preferably has slot widths of about (0.5) microns and a nominal spacing (center-to-center) of about 1 microns. Notably, the nominal spacing does vary slightly (by up to 3%) from one end to the other. On the module 116a, the spacing on the left side of the grating is larger than the spacing on the right hand side by about 3%. This differential spacing enables conversion from the $LP_{01}$ mode to the $LP_{02}$ mode within the grating 134 over a broad band of wavelength. Conversely, in module 116b, the spacing between individual grating regions is less when the grating is first encountered and greater at the end. This converts $LP_{02}$ to $LP_{01}$ within the grating 134 in converter 116b.

Again referring to FIG. 12 and 13, in operation, a light signal propagating in first lower-order mode, such as $LP_{01}$, in the transmission fiber passes into the amplifier stage 117 and then into the pigtail 130 on a first side of the dispersion compensating module 111 provided in the telecommunication/data communication system 110. The light then passes through the coupler 128 where the light signal is coupled into a second fiber, such as the conversion fiber 132. The conversion fiber has a length on the order of 5 cm to several meters or more and includes a terminal end 142. The light, upon encountering the reflective fiber grating 134, is reflected back and simultaneously converted to a second mode, such as the higher-order $LP_{02}$ mode. Little if any of the $LP_{02}$ mode can be propagated back into the pigtail 130 upon reflection because of the mismatch in the propagation constants β between the pigtail 130 and the conversion fiber 132 in the $LP_{02}$ mode. Notably, the conversion fiber 132 and the fiber interconnect 126, because of their refractive index profiles, as illustrated in FIGS. 15 and 17, are designed to readily propagate light an $LP_{02}$ mode.

Upon exit from the converter 116a, the light signal is then carried into the dispersion compensating fiber 115 mounted on holder 117 whereby compensation for the dispersion of the transmission fiber 113 takes place. Preferably, the DC fiber described with reference to FIG. 11 is utilized with the mode converters 116a, 116b, described herein as the fiber connect 126 and the DC fiber 115 have preferably matched profiles (at least for the innermost first segment) which leads to less transmission loss and mode coupling at the splices between the fiber interconnect 126 and the DC fiber 115.

Upon exiting the DC fiber 115 wound on holder 117, the light signal propagates into fiber interconnect 126 of converter 116b, and through coupler 128 thereof where the light signal is coupled into another fiber 132 including another fiber grating 134 as heretofore described with reference to 116a (except that the spacing intervals are reversed).

Within the mode converter 116b, the light signal is converted back to a lower order $LP_{01}$ mode by the reflective fiber grating 134 and reflects back into the fiber pigtail 130. The pigtail readily propagates light in the $LP_{01}$ mode because of the matched propagation coefficients. The signal then passes into the next amplifier stage 117 or into another section of transmission fiber or, optionally, directly into an opto-electronic detector or other optical module. Accordingly, it should be recognized that upon passing through the DC module 111, the dispersion of the previous length 113 has been partially or fully, compensated for. Moreover, it should be recognized that a plurality of alternating lengths of transmission fiber, amplifier stages 117, and DC modules 111 including the dispersion compensating fiber 115, the mode converter and coupler in accordance with the present invention may be utilized in series to compensate for dispersion over any desired system distance. Moreover, it should be recognized that a second mode converter 116b, may not be required in all instances.

It will be apparent to those of ordinary skill in the art that various modifications and variations can be made to the present invention without departing from the scope of the invention. Thus, it is intended that the present invention cover the modifications and variations provided they come within the scope of the appended claims and their equivalents.

What is claimed is:

1. A dispersion compensating optical waveguide comprising:
    a plurality of core segments, the refractive index profile of which are selected to result in an optical waveguide capable of propagating a light signal in an $LP_{02}$ mode a sufficient distance to compensate for dispersion of a transmission optical waveguide having a length greater than 25 km that propagates the signal in an $LP_{01}$ mode.

2. The waveguide of claim 1 wherein the plurality of core segments further comprise:
    (a) a first core segment having an outer radius in the range between about 3 μm and 9 μm and a Δ% peak in the range between about 1.0% and 2.5%,
    (b) a second core segment having an outer radius in the range between about 7 μm and 13 μm and a Δ% peak in the range between about 0.3% and −0.5%, and
    (c) a third core segment having an outer radius between about 10 μm and 25 μm and a Δ% peak in the range between about 0.2% and 1.0%.

3. The waveguide of claim 1 wherein the plurality of core segments further comprise:
    (a) a first core segment having an outer radius in the range between about 3 μm and 9 μm and a Δ% peak in the range between about 1.0% and 2.5%,
    (b) a second core segment having a width in the range between about 2 μm and 8 μm and a Δ% peak in the range between about 0.2% and −0.5%, and
    (c) a third core segment having a width in the range between about 1 μm and 10 μm and a Δ% peak in the range between about 0.2% and 1.0%.

4. The waveguide of claim 1 wherein the plurality of core segments further comprise:
    (a) a first core segment having an outer radius in the range between about 4 μm and 8 μm and a Δ% peak in the range between about 1.5% and 2.5%,
    (b) a second core segment having a width in the range between about 4 μm and 6 μm and a Δ% peak in the range between about 0.3% and 0.1%, and
    (c) a third core segment having a width in the range between about 4 μm and 8 μm and a Δ% peak in the range between about 0.3% and 0.7%.

5. The waveguide of claim 1 wherein said refractive index profile is selected to provide:

(a) an effective area greater than about 60 μm² at 1550 nm in the $LP_{02}$ mode,
    (b) a dispersion value at about 1550 nm in the $LP_{02}$ mode between about −50 and −400 ps/nm/km, and
    (c) a dispersion slope value at about 1550 nm in the $LP_{02}$ mode between about −0.01 and −20 ps/nm²/km.

6. The waveguide of claim 1 wherein the plurality of core segments further comprise:
    (a) a first core segment having an outer radius in the range between about 3 μm and 8 μm and a Δ% peak of greater than 1.5%,
    (b) a second core segment having an outer radius in the range between about 8 μm and 12 μm and a Δ% peak in the range between about 0.3% and 0.1%, and
    (c) a third core segment having an outer radius between about 14 μm and 20 μm and a Δ% peak in the range between about 0.2% and 0.6%.

7. The waveguide of claim 1 wherein the plurality of core segments further comprise:
    (a) a first core segment having an outer radius in the range between about 4 μm and 8 μm and a Δ% peak of greater than about 1.5%, and
    (b) a sub-segment within the first core segment having a inner radius of between about 3 μm and 6 μm and a Δ% peak in the range between about 0.6% and 1.4%.

8. The waveguide of claim 1 wherein the refractive index profile is selected to result in the waveguide exhibiting a kappa value between about 10 nm and about 500 nm, where kappa is the ratio of dispersion in the $LP_{02}$ mode at 1550 nm divided by dispersion slope in the $LP_{02}$ mode at 1550 nm.

9. The waveguide of claim 8 wherein the kappa value is in the range between about 30 nm and about 70 nm.

10. The waveguide of claim 1 wherein the refractive index profile is selected to result in the waveguide exhibiting an effective area greater than about 30 μm² at about 1550 nm in the $LP_{02}$ mode.

11. The waveguide of claim 10 wherein the refractive index profile is selected to result in the waveguide exhibiting an effective area greater than about 60 μm².

12. The waveguide of claim 11 having a length between about 0.5 km and about 3 km and is capable of propagating a light signal in an $LP_{02}$ mode along an entire length thereof to compensate for dispersion of a length of transmission fiber adapted to propagate the light signal in an $LP_{01}$ mode.

13. The waveguide of claim 10 wherein the refractive index profile is selected to result in the waveguide exhibiting an effective area in the range between about 30 μm² and 150 μm².

14. The waveguide of claim 10 wherein the refractive index profile is selected to result in the waveguide exhibiting an effective area in the range between about 50 μm² and 90 μm².

15. The waveguide of claim 1 wherein the refractive index profile is selected to result in the waveguide exhibiting a dispersion value at about 1550 nm and in the $LP_{02}$ mode between about −10 ps/nm/km and about −1000 ps/nm/km.

16. The waveguide of claim 15 wherein the refractive index profile is selected to result in the waveguide exhibiting a dispersion value at about 1550 nm and in the $LP_{02}$ mode between about −50 ps/nm/km and about −400 ps/nm/km.

17. The waveguide of claim 1 wherein the refractive index profile is selected to result in the waveguide exhibiting a dispersion slope value at about 1550 nm and in the $LP_{02}$ mode between about −0.01 ps/nm²/km and about −20 ps/nm²/km.

18. The waveguide of claim 17 wherein the refractive index profile is selected to result in the waveguide exhibiting a dispersion slope value at about 1550 nm and in the $LP_{02}$ mode between about −1 ps/nm²/km and about −10 ps/nm²/km.

19. The waveguide of claim 1 wherein the refractive index profile is selected to result in the waveguide exhibiting:
   (a) a dispersion value at about 1550 nm and in the $LP_{02}$ mode between about −50 ps/nm/km and about −400 ps/nm/km
   (b) a dispersion slope value at about 1550 nm and in the $LP_{02}$ mode between about −1 ps/nm²/km and about −10 ps/nm²/km, and
   (c) an effective area in the range between about 50 μm² and 90 μm² at about 1550 nm in the $LP_{02}$ mode.

20. The waveguide of claim 1 wherein the plurality of core segments comprises at least three core segments.

21. The waveguide of claim 1 wherein $n_1 > n_3 > n_2$.

22. The waveguide of claim 1 wherein a first core segment of the plurality of core segments comprises a Δ% peak in the range between about 1.0% and 2.5%.

23. The waveguide of claim 1 wherein a first core segment of the plurality of core segments comprises a Δ% peak greater than about 1.5%.

24. The waveguide of claim 23 wherein the Δ% peak is greater than about 2.0%.

25. The waveguide of claim 1 wherein a second core segment of the plurality of core segments comprises a Δ% peak of greater than about 0.0%.

26. The waveguide of claim 1 wherein the Δ% peak of the second core segment is in the range between about 0.3% and about −0.1%.

27. The waveguide of claim 1 wherein a third core segment of the plurality of core segments comprises a Δ% peak in the range between about 0.2% and about 1.0%.

28. The waveguide of claim 27 wherein the Δ% peak of the third core segment is in the range between about 0.3% and about 0.6%.

29. The waveguide of claim 1 wherein a second core segment of the plurality of segments has a radius R3 between about 10 μm and about 20 μm.

30. The waveguide of claim 29 further comprising a radius R2 between about 7 μm and about 13 μm.

31. The waveguide of claim 1 further comprising a first core segment of the plurality of core segments including a Δ% of less than about 1.0 at a centerline of the dispersion compensating waveguide and a Δ% peak at a radius greater than 1 μm having a Δ% peak of greater than about 1.5%.

32. The waveguide of claim 1 wherein a first core segment of the plurality of core segments has a peak Δ% in the range of between about 1.0% and about 2.5% and is positioned at a radius dimension between about 1 μm and about 3 μm.

33. The waveguide of claim 1 wherein the dispersion compensating optical waveguide has a length between about 0.5 km and about 3 km.

34. The waveguide of claim 1 having a length between about 0.5 km and about 3.0 km.

35. A dispersion compensating optical waveguide comprising:
   a plurality of core segments, the refractive index profile of which results in a waveguide capable of propagating a light signal in an $LP_{02}$ mode at about 1550 nm by the dispersion compensation optical waveguide through a sufficient length, upon conversion to the $LP_{02}$ mode, to compensate for dispersion of a transmission waveguide propagating in a $LP_{01}$ mode at about 1550 nm, the transmission waveguide having a length greater than about 25 km, the dispersion compensating optical waveguide including;
   (a) a first core segment having an outer radius in the range between about 4 μm and 8 μm and a Δ% peak of greater than 1.5%,
   (b) a second core segment having an outer radius in the range between about 8 μm and 12 μm and a Δ% peak greater than 0.0%, and
   (c) a third core segment having an outer radius between about 10 μm and 25 μm and a Δ% peak greater than about 0.2%.

36. A dispersion compensating waveguide comprising:
   a plurality of core segments, the refractive index profile of which results in properties capable of propagating a light signal in an $LP_{02}$ mode at about 1550 nm by the dispersion compensation waveguide through a sufficient length, upon conversion to the $LP_{02}$ mode and at 1550 nm, to compensate for dispersion of a transmission waveguide propagating in a $LP_{01}$ mode, the transmission waveguide having a length greater than 25 km, the dispersion compensating optical waveguide including;
   (a) a first core segment having an outer radius in the range between about 4 μm and 8 μm and a Δ% peak in the range between about greater than 1.5%,
   (b) a sub-segment within the first core segment having a inner radius of between about 3 μm and 6 μm and a Δ% peak in the range between about 0.6% and about 1.4%,
   (c) a second core segment having an outer radius in the range between about 8 μm and 12 μm and a Δ% peak in the range between about 0.3% and about −0.5%, and
   (d) a third core segment having an outer radius between about 14 μm and 20 μm and a Δ% peak in the range between about 0.2% and about 0.8%.

37. A dispersion compensating waveguide comprising:
   a plurality of core segments, the refractive index profile of which is selected to result in the dispersion compensating waveguide being capable of propagating a light signal in an $LP_{02}$ mode at about 1550 nm a sufficient distance to compensate for dispersion of a transmission waveguide having a length greater than 25 km that propagates the light signal in an $LP_{01}$ mode at about 1550 nm, the dispersion compensating waveguide having the following properties:
   (a) a kappa value between about 30 nm to about 150 nm at about 1550 nm and in the $LP_{02}$ mode;
   (b) an effective area between about 30 μm² and about 150 μm² at about 1550 nm and in the $LP_{02}$ mode; and
   (c) a dispersion value of −50 to −400 ps/km/nm at about 1550 nm and in the $LP_{02}$ mode.

* * * * *

UNITED STATES PATENT AND TRADEMARK OFFICE
CERTIFICATE OF CORRECTION

PATENT NO.    : 6,453,102 B1
DATED         : September 17, 2002
INVENTOR(S)   : Dong Liang et al.

It is certified that error appears in the above-identified patent and that said Letters Patent is hereby corrected as shown below:

Column 15,
Line 27, "which are selected to result in an optical waveguide" should be -- the core segments is selected to --
Line 28, "capable of propagating a light signal in an $LP_{02}$ mode" should be
-- propagate a light signal in an $LP_{02}$ mode --
Line 29, "a sufficient distance to compensate for dispersion of a" should be -- a sufficient distance to compensate dispersion of a --

Column 17,
Line 16, "21. The waveguide of claim 1 wherein $n_1>n_3>n_2$." should be
-- 21. The waveguide of claim 1 further comprising a relative refractive index of a first core segment $n_1$, a relative refractive index of a second core segment $n_2$, and a relative refractive index of a third core segment $n_3$, wherein $n_1>n_3>n_2$. --
Line 37, "29. The waveguide of claim 1 wherein a second core" should be
-- 29. The waveguide of claim 1 wherein a third core --
Line 40, 30. The waveguide of claim 29 further comprising a" should be
-- 30. The waveguide of claim 29 wherein a second core segment of the plurality of segments has a --
Line 58, "a plurality of core segments, the refractive index profile of" should be -- a plurality of core segments, the refractive index profile of the --
Line 59, "which results in a waveguide capable of propagating a" should be -- core segments results in a waveguide propagating a --

Column 18,
Line 14, "compensate for dispersion of a transmission waveguide" should be
-- compensate dispersion of a transmission waveguide --.

Signed and Sealed this

Ninth Day of September, 2003

JAMES E. ROGAN
*Director of the United States Patent and Trademark Office*